(12) United States Patent
Arai

(10) Patent No.: US 8,794,591 B2
(45) Date of Patent: Aug. 5, 2014

(54) MOTOR OPERATED VALVE

(75) Inventor: Yusuke Arai, Tokyo (JP)

(73) Assignee: Fujikoki Corporation, Tokyo (JP)

( * ) Notice: Subject to any disclaimer, the term of this patent is extended or adjusted under 35 U.S.C. 154(b) by 188 days.

(21) Appl. No.: 13/217,886

(22) Filed: Aug. 25, 2011

(65) Prior Publication Data

US 2012/0068098 A1   Mar. 22, 2012

(30) Foreign Application Priority Data

Sep. 22, 2010 (JP) .................................. 2010-212642

(51) Int. Cl.
*F16K 31/02* (2006.01)

(52) U.S. Cl.
USPC ...................................... 251/129.11; 251/248

(58) Field of Classification Search
USPC .............................. 251/129.11, 248; 475/330
See application file for complete search history.

(56) References Cited

U.S. PATENT DOCUMENTS

| | | | | |
|---|---|---|---|---|
| 2,533,611 | A * | 12/1950 | Norelius ......................... | 475/22 |
| 4,603,594 | A | 8/1986 | Grimm | |
| 5,117,784 | A * | 6/1992 | Schechter et al. ......... | 123/90.17 |
| 5,171,195 | A | 12/1992 | Funamoto | |
| 6,254,058 | B1 * | 7/2001 | Keller ............................. | 251/69 |
| 6,527,671 | B2 * | 3/2003 | Paalasmaa et al. ............. | 477/99 |
| 6,537,169 | B1 * | 3/2003 | Morii ................................ | 475/8 |
| 7,325,780 | B2 * | 2/2008 | Arai et al. ....................... | 251/65 |
| 7,523,917 | B2 * | 4/2009 | Arai .......................... | 251/129.11 |
| 7,758,013 | B2 * | 7/2010 | Arai et al. ....................... | 251/85 |
| 2003/0230735 | A1 * | 12/2003 | Minegishi et al. ............ | 251/248 |
| 2006/0180780 | A1 * | 8/2006 | Arai et al. ................. | 251/129.11 |
| 2007/0018128 | A1 * | 1/2007 | Arai .......................... | 251/129.11 |
| 2008/0067464 | A1 * | 3/2008 | Arai et al. ...................... | 251/319 |
| 2012/0241024 | A1 * | 9/2012 | Arai et al. .................. | 137/487.5 |
| 2013/0153056 | A1 * | 6/2013 | Arai .............................. | 137/485 |
| 2013/0167949 | A1 * | 7/2013 | Arai .......................... | 137/487.5 |

FOREIGN PATENT DOCUMENTS

| | | |
|---|---|---|
| FR | 719973 | 2/1932 |
| FR | 1086343 | 2/1955 |
| GB | 421438 | 12/1934 |
| JP | 03-223547 | 10/1991 |

(Continued)

OTHER PUBLICATIONS

Office Action from the Japanese Patent Office in connection with corresponding Japanese patent application No. 2010-212642.

*Primary Examiner* — John Rivell
*Assistant Examiner* — Matthew W Jellett
(74) *Attorney, Agent, or Firm* — Fildes & Outland, P.C.

(57) ABSTRACT

The invention provides a motor-operated valve including a planetary gear mechanism achieving a greater reduction gear ratio without increasing the number of teeth of the gears, thereby enabling downsizing. In a planetary gear mechanism 1, a sun gear 91 functioning as an input gear receives smaller load than an internally toothed output gear 45, so gears (second planet gears 95) having a smaller module are connected to the planet gears 93, and the sun gear 91 is in engagement with the second planet gears 95. The sun gear 91 is formed of a same module as the second planet gears 95. The rotation of the sun gear 91 is reduced in speed and transmitted to the second planet gears 95, and rotation of the second planet gears 95 rotated at a reduced speed is further reduced by the slight difference in the numbers of teeth of the ring gear 44 and the internally toothed output gear 45 before being output.

8 Claims, 6 Drawing Sheets

(56) References Cited

FOREIGN PATENT DOCUMENTS

| JP | 2007-321978 | 12/2007 |
| JP | 2008-267464 | 11/2008 |
| WO | 2007/135338 | 11/2007 |

* cited by examiner

MOTOR OPERATED VALVE

The present application is based on and claims priority of Japanese patent application No. 2010-212642 filed on Sep. 22, 2010, the entire contents of which are hereby incorporated by reference.

BACKGROUND OF THE INVENTION

1. Field of the Invention

The present invention relates to a planetary gear mechanism comprising a sun gear, one or more planet gears, an internally toothed fixed gear and an internally toothed turning gear, and a motor-operated valve using the same for controlling the flow rate of a refrigerant in an air conditioner or the like.

2. Description of the Related Art

Conventionally, so-called motor-operated valves exist for controlling the opening and closing of valves via electric motors in which the rotation of a rotor is directly transmitted to a screw mechanism to control the opening and closing of valves. There are also proposed motor-operated valves in which the rotation of the rotor is reduced via a reduction gear mechanism before the rotation is transmitted to the screw mechanism. Since the torque per unit rotation of the rotor in such valves is high, the valves can be applied to uses where high load is applied, and the resolution of the valve opening per single drive pulse can be improved.

The present applicant has proposed a motor-operated valve for reducing the rotation of an electric motor via a reduction mechanism and transmitting the same, wherein the rotation is converted via a planetary gear type reduction mechanism to the opening and closing movement of a valve, characterized in that the relationship among the gear module used in the planetary gear type reduction mechanism, the reduction gear ratio, and the toothed bottom diameter of the internally toothed output gear for taking out the output rotation from the planetary gear type reduction mechanism is set within a fixed range, so as to achieve a well-balanced dimension range of the respective gears serving as elements constituting the planetary gear type reduction mechanism, and wherein the planetary gear type reduction mechanism having a high reduction gear ratio can be arranged within a rotor of a motor that determines the outer diameter of the motor-operated valve, with the aim to provide a downsized motor-operated valve capable of achieving a large torque from the reduced output (Japanese patent application laid-open publication No. 2007-321978 or patent document 1 and Japanese patent application laid-open publication No. 2008-267464 or patent document 2).

The motor-operated valve according to patent document 1 or patent document 2 comprises a valve body having a valve chamber formed therein, a valve seat formed on a portion of a wall surface of the valve chamber, a valve member capable of being moved to open and close an opening formed on the valve seat, a valve shaft for moving the valve member to be in contact with the opening or away therefrom, a cylindrical can attached to the valve body and defining a space between the valve body, an exciting device (stator) of the electric motor attached to an outer circumference of the can, a permanent magnet-type rotor assembly supported rotatably within the can and rotated via the exciting device, and a screw mechanism for transmitting the output rotation from a 3K-type mechanical paradox planetary gear reduction mechanism to a valve shaft and converting the same to the movement of the valve member coming in contact with or separating from the valve seat, wherein the rotor assembly and the planetary gear type reduction mechanism are arranged within a space defined by the valve body and the can.

FIGS. 4 through 6 illustrate an example of a motor-operated valve in which the above-described prior art planetary gear type reduction mechanism is applied. FIG. 4 is a vertical cross-sectional view showing the whole body according to one example of a prior art motor-operated valve, FIG. 5 is a perspective view in which the planetary gear type reduction mechanism adopted in the motor-operated valve shown in FIG. 4 is partially cut away, and FIG. 6 is an exploded view of the planetary gear type reduction mechanism shown in FIG. 5. The motor-operated valve denoted as a whole by reference number 100 comprises a driving unit 1a having a motor composed of a stator 2 and a rotor assembly 8 and operated via excitation function, a gear reduction unit 1b to which the rotational driving force from the driving unit 1a is entered, wherein rotation is subjected to gear reduction and output as reduced rotation, and a feed screw mechanism unit 1c for converting the reduced rotation output from the gear reduction unit 1b via a screw operation to a displacement along the screw axis direction and outputting the same.

Reference number 30 denotes a cylindrical can with a ceiling which is an airtight chamber fixed to the valve body 10 via a receiver member 68, wherein the drive unit 1a includes an excitation device of the electric motor arranged on the outer circumference of the can 30 and having a coil 140 wound around a bobbin molded integrally with a resin, that is, a stator 2, and a permanent magnet-type rotor assembly 8 rotatably supported within the can 30 and driven to rotate via the stator 2. The stator 2 and the rotor assembly 8 constitute a stepping motor as an example of an electric motor.

The stator 2 is fit in a detachable manner to the can 30 via a mounting bracket 180 formed of a leaf spring. In the present example, the stator 2 is fixed to position by having a projection 102 formed on the can 30 elastically fit into a hole 182 formed on the mounting bracket 180. Power is fed from an external power supply to the coil 140 via a connector 141 and a lead 142 so as to excite the stator 2. The valve body 10 has a valve chamber 14 formed therein and an orifice 16 formed on the bottom unit 15 opened on a bottom wall of the valve body 10. The valve body 10 has a pipe 22 connected to a side wall of the valve chamber 14 and a pipe 20 connected to a lower end of the orifice 16.

A gear reduction unit 1b is composed of a planetary gear type reduction mechanism (hereinafter abbreviated as "reduction mechanism") 40 for reducing the speed of rotation of the rotor assembly 8. The reduction mechanism 40 comprises a sun gear 41 formed integrally with the rotor assembly 8, a plurality of vertically longitudinal planet gears 43, formed for example by molding plastic, supported rotatably via a carrier 42 and being in engagement with the sun gear 41, a ring gear 44 arranged concentrically with the sun gear and supported in a fixed manner to the valve body 10 while being in engagement with a portion (upper side portion) of the respective planet gears 43, and an internally toothed output gear 45 formed in the shape of a cylinder with a bottom and having internal teeth formed on the internal circumference thereof (i.e. being in a profile shifted relationship with the ring gear 44) having a number of teeth slightly different from the number of teeth of the ring gear 44. Each planet gear 43 is in engagement with the ring gear 44, while a portion (lower side portion) thereof is in engagement with the internally toothed output gear 45. The rotation of the rotor assembly 8 reduced via the reduction mechanism 40 is transmitted through an output gear 45 to an output shaft (driver) 46 of the feed screw mechanism 1c. The rotor assembly 8 is formed using a plastic material containing magnetic materials so that a cylindrical body 202 defining a surrounding wall and a sun gear member 204 arranged at a center thereof are formed integrally in a cylindrical shape with a ceiling, which is arranged rotatably within the can 30 via a shaft 201 passed vertically through the sun gear member 204. The sun gear 41 is formed on an outer circumference of a boss extending from the center of the sun gear member 204. The ring gear 44 is a ring-shaped gear formed for example by molding plastic, the lower portion of which is fixed to an upper portion of a gear case 220 which is a cylindrical member fit to an upper portion of the valve body 10.

According to such arrangement, when the sun gear 41 receiving input of the output rotation of the electric motor rotates, the planet gears 43 in engagement with the sun gear 41 and the ring gear 44 rotate while orbiting around the sun gear 41. Since the planet gears 43 are in engagement with the internally toothed output gear 45 which is in a profile shifted relationship with respect to the ring gear 44, the rotation of the planet gears 43 rotates the internally toothed output gear 45 to rotate at a relatively extremely high reduction gear ratio, such as 50-to-1, with respect to the ring gear 44 in accordance with the level of profile shifting (difference in the numbers of teeth). The planetary gear mechanism in which the planet gears 43 are in engagement with a ring gear 44 and an internally toothed output gear 45 in a profile shifted relationship therewith is so-called a paradox planetary gear mechanism.

The feed screw mechanism 1c is equipped with a cylindrical bearing 50, a threaded shaft 52 and a ball 65. The cylindrical bearing 50 has its lower end fit within the valve body 10, and it is attached in a non-detachable manner to the valve body 10 via means such as press working in a state where the bearing 50 is supported via an upper flange portion 75 of a spring bracket body (a cylindrical surrounding wall) 74 to a stepped portion 64 of the valve body 10. The upper surface of the cylindrical bearing 50 supports the internally toothed output gear 45 of the reduction gear mechanism 40 from below, and an output shaft 46 of the gear reduction mechanism 40 is inserted to the hollow upper portion of the cylindrical bearing 50. An external screw portion 53 formed on an outer circumference of the threaded shaft 52 is screw-engaged to an internal screw portion 51 formed on the hollow lower portion of the cylindrical bearing 50. Further, a projection 54 being a flat driver disposed on the threaded shaft 52 is inserted to a slit-like recess 55 formed on the lower end of the output shaft 46 of the reduction gear mechanism 40, thereby transmitting the rotation of the output shaft 46 to the threaded shaft 52. A recessed portion is formed on the lower end of the threaded shaft 52, and a ball 65 fit within the recess is fixed to the threaded shaft 52. The rotation of the threaded shaft 52 is converted into axial movement via the screwing action with respect to the cylindrical bearing 50, which is transmitted via the ball 65 and a ball bearing 66 to the valve shaft 60. Further, it is possible to form a recess to the threaded shaft 52 and to form a projection to the output shaft 46 to be inserted to the recess.

In the feed screw mechanism 1c, the valve body 10 is provided with a coil spring 70 that biases the valve shaft 60 toward the valve opening direction in order to eliminate the backlash between the internal screw portion 51 and the external screw portion 53 when moving the threaded shaft 52 in the valve opening direction. A metallic cylindrical spring bracket 73 with a bottom (spring cover member) is disposed in a valve chamber 12 for supporting the coil spring 70. The spring bracket 73 comprises a cylindrical surrounding wall 74 covering the outer circumference of the valve shaft 60 excluding the lower end thereof, an upper flange portion (external flange portion) 75 bent toward the outer side formed on the upper end thereof, a lower flange portion (inner flange portion) 76 bent toward the inner side while leaving a hole 77 through which the valve shaft 60 can pass through formed on the lower end of the surrounding wall 74, and a guide portion 78 extending further toward the leading end from the lower flange portion 76 for guiding the valve shaft 60. The coil spring 70 has its upper end portion being in contact with a large diameter portion 67 of the valve shaft 60, and has its lower end portion being in contact with the lower flange portion 76 of the spring bracket 73, by which the coil spring is supported in a compressed state. The upper flange portion 75 of the surrounding wall 74 is fixed in a sandwiched manner between the stepped portion 64 formed on the lower end of a valve hole 63 of the valve body 10 and a lower end of the cylindrical bearing 50 fit to the valve hole 63.

The spring force of the coil spring 70 maintained in a compressed state by the spring bracket 73 constantly biases the valve shaft 60 toward the valve opening direction (direction of the screw mechanism 1c), and when the force provided from the feed screw mechanism 1c presses down the valve shaft 60 toward the valve closing direction, the valve shaft 60 is pushed down resisting against the spring force of the coil spring 70 so that a valve member 61 formed on the leading end of the valve shaft 60 is seated on the valve seat 62 to close the orifice 16. The threaded shaft 52 can rotate by a small number of rotations with respect to the rotation of the rotor assembly 8, and therefore, the axial displacement of the threaded shaft 52 in correspondence with the rotation thereof can be controlled via a smaller amount of displacement, so that the position of the valve shaft 60 with respect to the valve seat 62 can be controlled via high resolution by the gear reduction unit 1b and the flow passage area between the valve member 61 and the orifice 16 can be controlled with high accuracy, by which the flow rate of the refrigerant passing therethrough can be controlled with high accuracy. In other words, a valve opening control via high resolution can be realized according to this arrangement. When the feed screw mechanism 1c is moved in the valve opening direction, the spring force of the coil spring 70 enables the valve shaft 60 to move in the direction following the movement of the threaded shaft 52 toward the upper direction.

In the motor-operated valve illustrated in FIG. 4, refrigerant is introduced into the can 30 through the fine space between the valve shaft 60 and the inner side of the guide portion 78 (hole 77) of the spring bracket 73, and also through the space formed arbitrarily between the valve body 10 and the cylindrical bearing 50. The fine space between the valve shaft 60 and the guide portion 78 of the spring bracket 73 has a function to prevent foreign matter that may be contained in the refrigerant from entering the can 30.

If the module of the gear is set within the range of 0.2 to 0.4 and the bottom teeth diameter of the ring gear of the planetary gear type reduction mechanism is set to 15 mm or smaller, for example, the reduction gear ratio achieved by the planetary gear type reduction mechanism can be as high as 30 to 100. By selecting the module and the diameter of the ring gear within the above-mentioned numerical ranges, a motor-operated valve having a high reduction gear ratio with a sufficiently small axial length and diameter size can be obtained without a complicated manufacturing process.

However, according to the motor-operated valve taught in the above-mentioned patent documents, the reduction gear ratio of the mechanical paradox planetary gear mechanism is determined naturally by the numbers of teeth of the respective gears, as taught in the documents. Further, the gears must have the same module according to the disclosed arrangements. Now, the numbers of teeth of the planetary gears are not relevant in calculating the reduction gear ratio of the planetary gear mechanism, and the reduction gear ratio is determined by the difference in the number of teeth of the inner gears (including the differences in the numbers of teeth of the inner gears) and the number of teeth of the sun gear. Therefore, the reduction gear ratio will increase as the ratio of the number of teeth of the sun gear<the number of teeth of the inner gear increases. As described, in a planetary gear mechanism in which all the teeth of the gears must be mutually engaged, the respective gears must have the same module, and the number of teeth of the planet gears is naturally determined based on the numbers of teeth (pitch diameters) of the sun gear and the inner gears (though the number may somewhat vary via displacement). However, the design of the planetary gear mechanism must satisfy various conditions (such as the number of planetary gears), and only the planetary gear mechanisms designed to satisfy such conditions can be manufactured.

According to the above-described planetary gear mechanism, the reduction gear ratio is set within a certain range when the external dimensions of the fixed gear and the output gear are determined, and it is impossible to achieve a higher reduction gear ratio. In order to achieve a high reduction gear ratio, the size of the whole gear mechanism must be increased. If the module is downsized in order to prevent the increase in size of the gear mechanism, the durability of the gears is deteriorated.

The object of the present invention is to provide a planetary gear mechanism having devised the relationship and structure of the sun gear and planet gears so as to achieve an enhanced reduction gear ratio, and a motor-operated valve to which the planetary gear mechanism is applied.

SUMMARY OF THE INVENTION

The present invention aims at solving the problems of the prior art by providing a planetary gear mechanism comprising a sun gear; one or more planet gears in engagement with the sun gear; an internally toothed fixed gear in engagement with the one or more planet gears; and an internally toothed turning gear in engagement with the one or more planet gears; wherein each planet gear is composed of a first planet gear in engagement with the internally toothed fixed gear and the internally toothed turning gear, and a second planet gear formed integrally with the first planet gear and having a smaller module than the first planet gear; and wherein the sun gear is in engagement with each second planet gear.

According to the present planetary gear mechanism, each planet gear is composed of a first planet gear in engagement with the internally toothed fixed gear and the internally toothed turning gear and a second planet gear in engagement with the sun gear, so that the module of the second planet gears does not have to be the same as the module of the first planet gears, and can be smaller than the module of the first planet gears. As a result, the freedom of selection of the number of teeth of the sun gear and the second planet gear in engagement therewith can be enhanced, and thus, the reduction gear ratio of the present mechanism can be improved compared to the prior art mechanical paradox planetary gear mechanism.

Further, the driving object can be driven via a large torque by simply downsizing the module of (the sun gear and) the secondary planet gears on the input side of the drive force of the planetary gear mechanism, so that the strength and durability of the planetary gear mechanism will not be deteriorated.

Furthermore, the present invention provides a motor-operated valve comprising a motor composed of a rotor and a stator, a valve member being moved toward and away from a valve seat disposed on the valve body, and the planetary gear mechanism described above, wherein the rotation of the rotor is transmitted to the sun gear, and the internally toothed turning gear is connected to the valve member.

According to the motor-operated valve of the present invention, the rotation of the rotor is transmitted to the sun gear, and the rotation of the sun gear is further transmitted to one or more second planet gears having a small module and entered to the planetary gear mechanism. The rotation of the second planet gears rotates the first planet gears, each of which is formed integrally with the second planet gear. Since the first planet gears are in engagement with the internally toothed fixed gear and the internally toothed turning gear, the rotation can be output via a high reduction gear ratio based on the difference in the numbers of teeth of the two internally toothed gears. Since the internally toothed turning gear is connected to the valve member, the valve member can be driven via a high reduction gear ratio, and thereby, the present arrangement enables to achieve a high output torque for driving the valve member.

As described, the present invention adopts an arrangement in which one or more planet gears are provided, and each of which is composed of a first planet gear in engagement with the internally toothed fixed gear and the internally toothed turning gear, and a second planet gear, which is formed integrally with the first planet gear, having a smaller module than the first planet gear and further in engagement with a sun gear, so that the present planetary gear mechanism is composed of a first level of planetary gear mechanism composed of the sun gear and one or more second planet gears in engagement therewith and a second level of planetary gear mechanism composed of one or more first planet gears in engagement with the internally toothed fixed gear and the internally toothed turning gear, wherein the two levels of planet gear mechanisms are arranged in line, according to which the reduction gear ratio of the motor-operated valve can be improved further.

DETAILED DESCRIPTION OF THE PREFERRED EMBODIMENTS

Now, a preferred embodiment of the planetary gear mechanism according to the present invention will be described with reference to the accompanied drawings. In the description of the embodiment of the planetary gear mechanism 90 and the motor-operated valve 1 according to the present invention illustrated in FIGS. 1 through 3, the components or parts which are the same as or equivalent to those constituting the prior art planetary gear mechanism 40 and prior art motor-operated valve 100 illustrated in FIGS. 4 through 6 are denoted with the same reference numbers, and detailed descriptions thereof are omitted.

Figure 1:
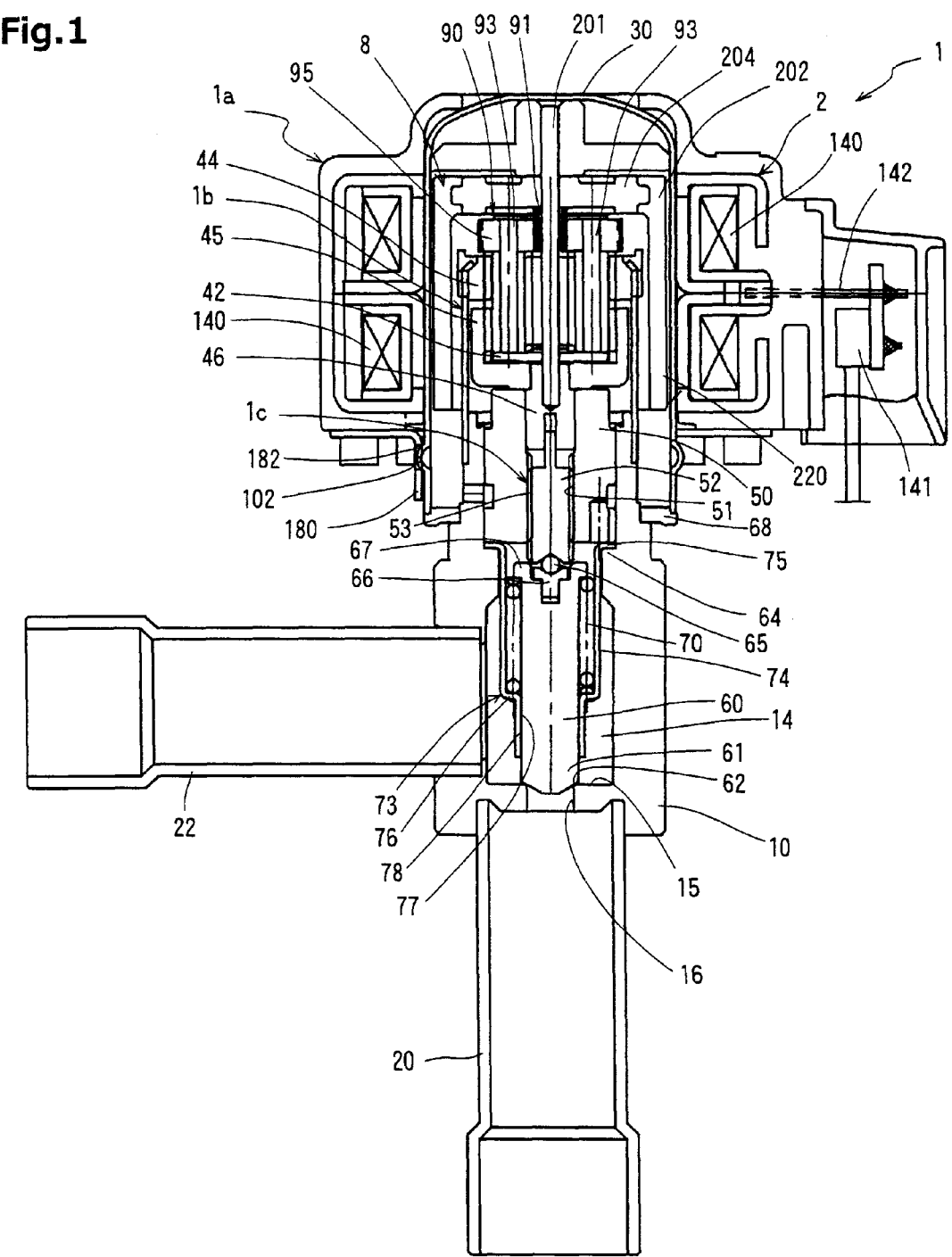
FIG. 1 is a vertical cross-sectional view showing a whole body of a motor-operated valve according to one preferred embodiment of the present invention.
Figure 2:
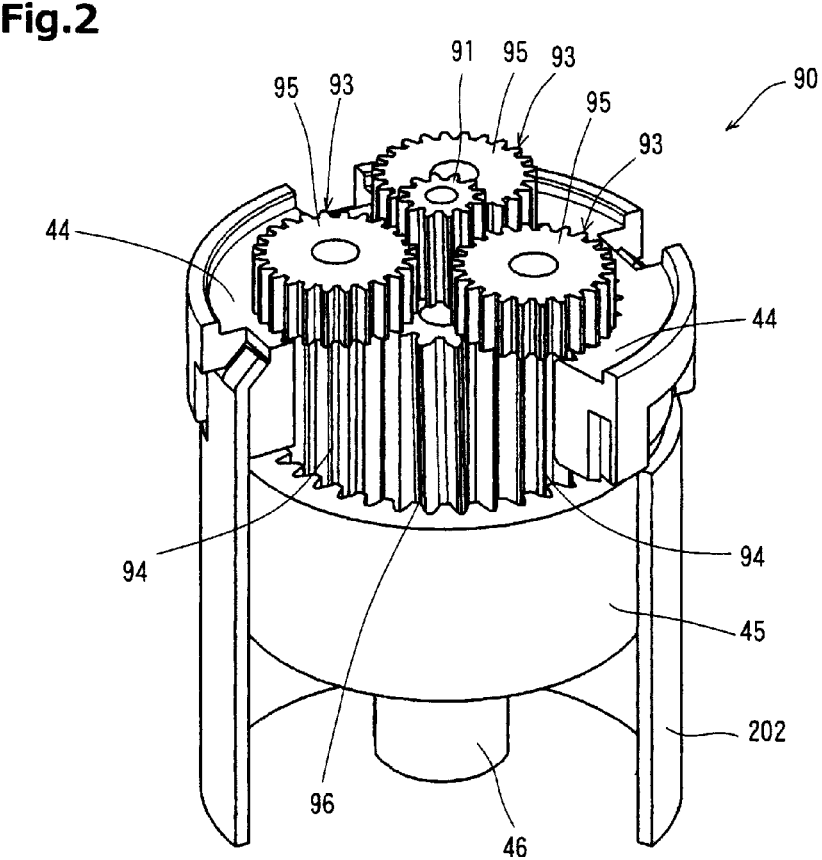
FIG. 2 is a partially cutaway perspective view of a planetary gear mechanism adopted in the motor-operated valve shown in FIG. 1.
Figure 3:
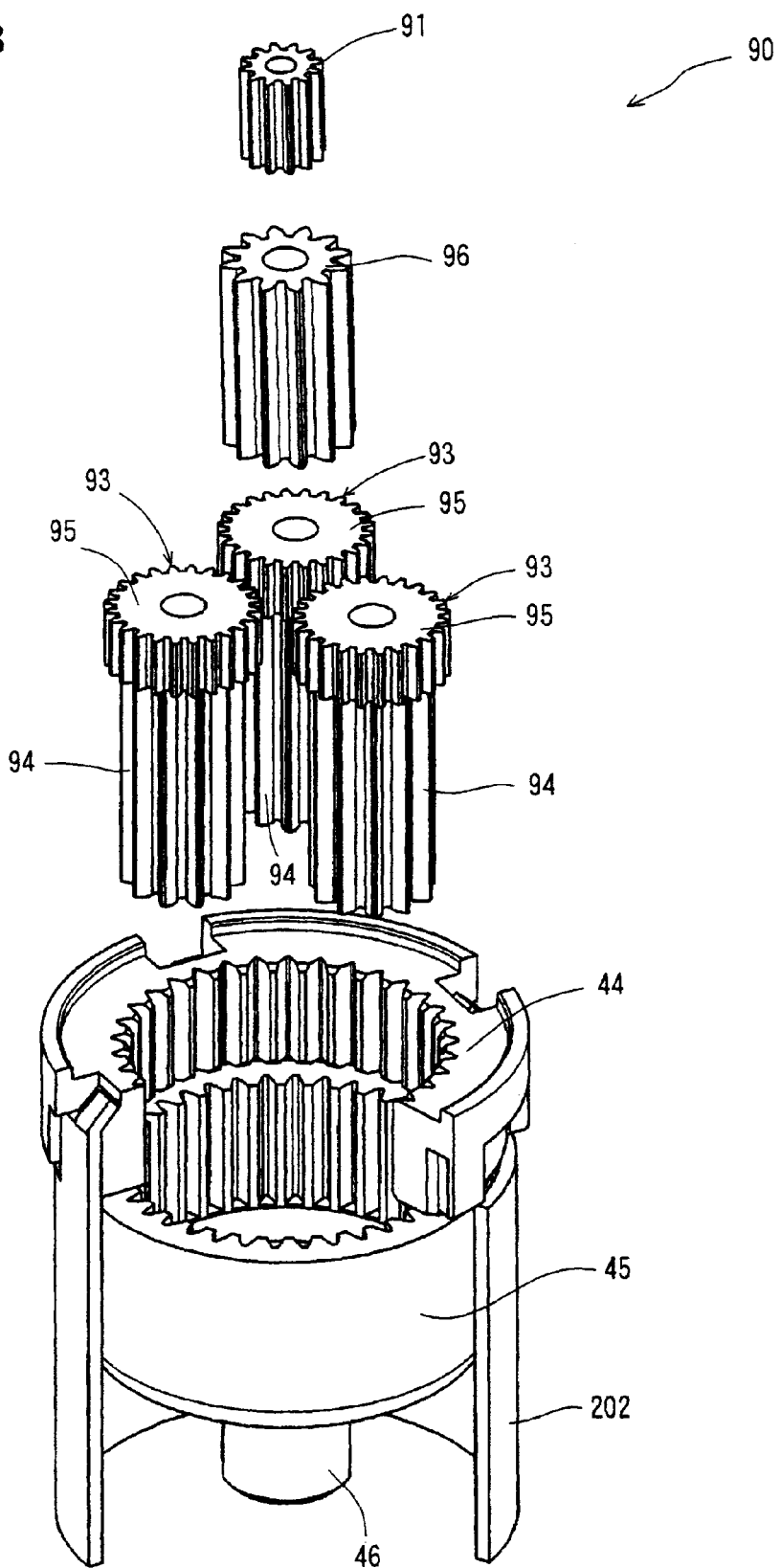
FIG. 3 is an exploded view of the planetary gear mechanism shown in FIG. 2.
Figure 4:
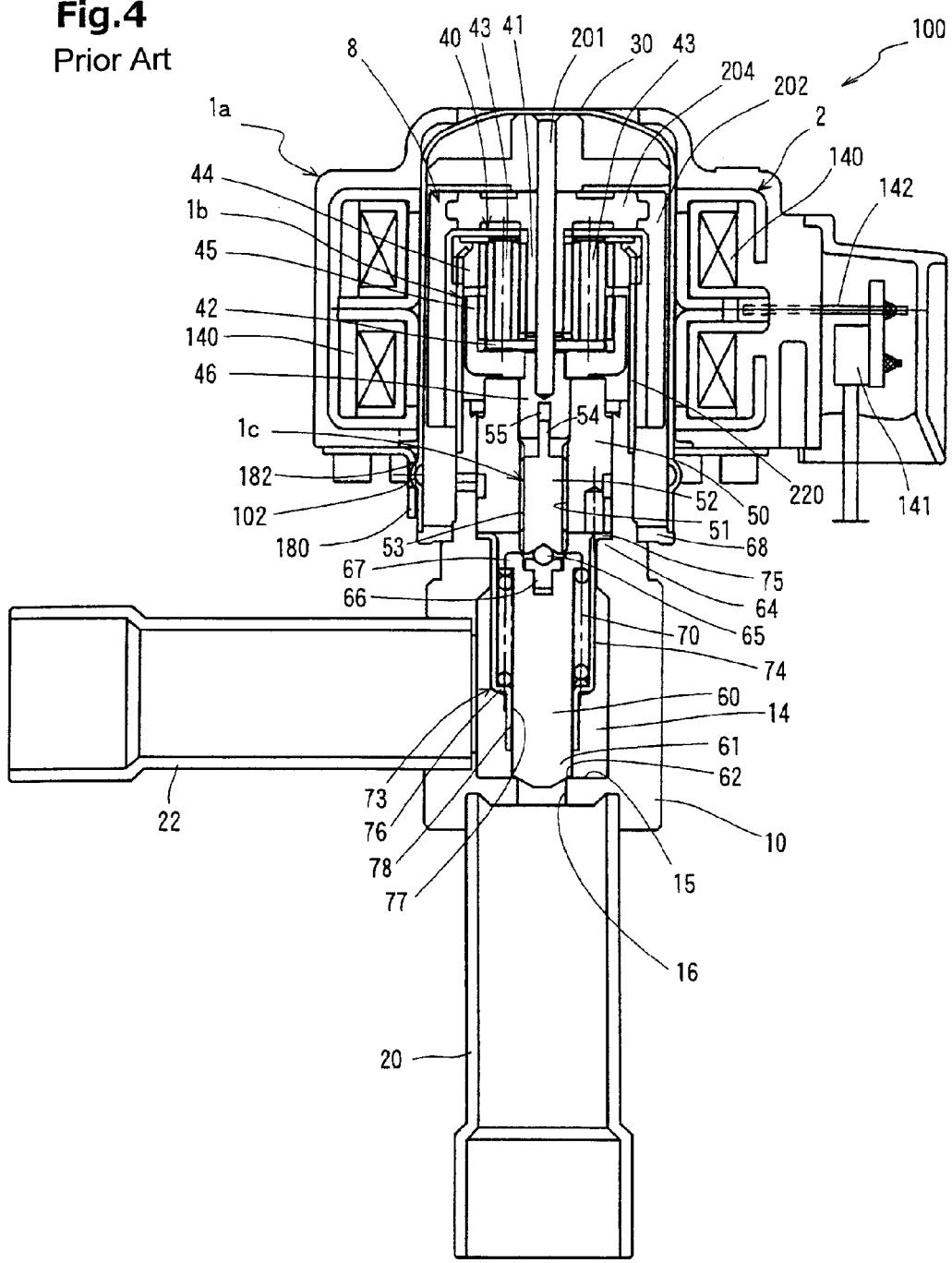
FIG. 4 is a vertical cross-sectional view showing a whole body of a motor-operated valve according to the prior art.
Figure 5:
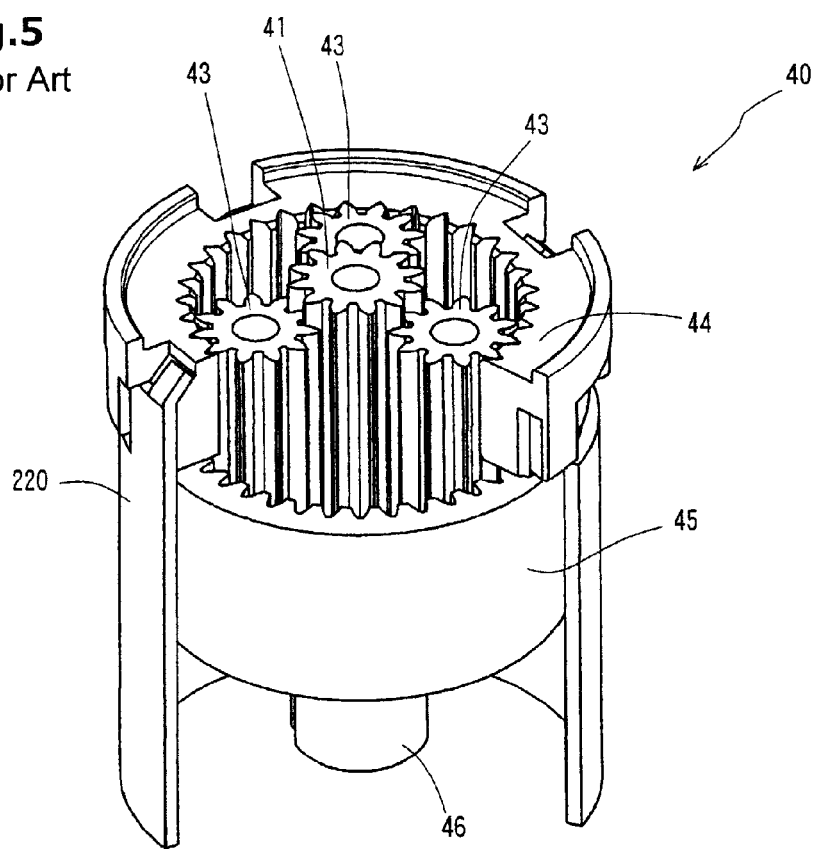
FIG. 5 is a partially cutaway perspective view of a planetary gear mechanism adopted in the motor-operated valve shown in FIG. 4.
Figure 6:
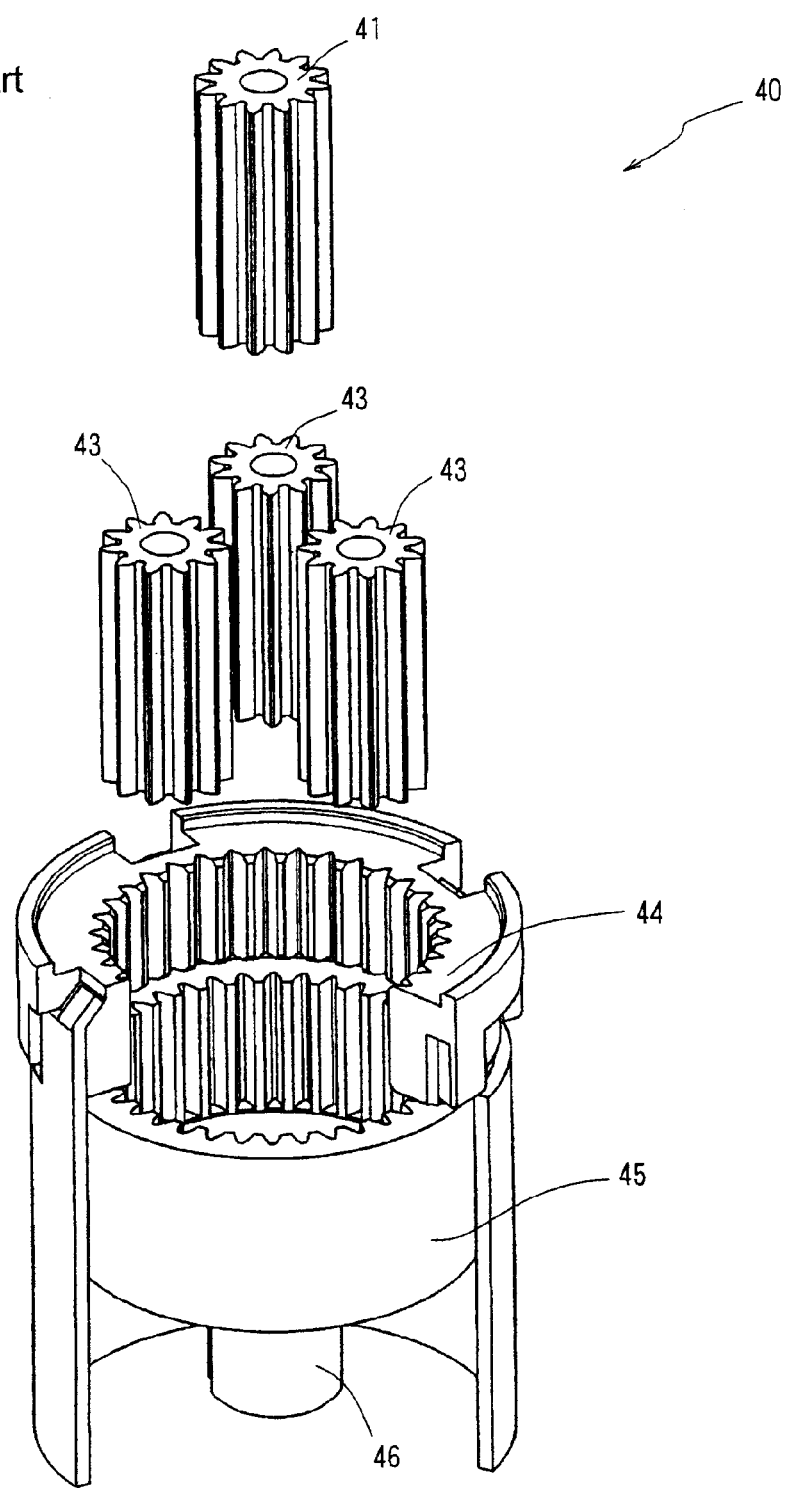
FIG. 6 is an exploded view of the planetary gear mechanism shown in FIG. 5.

According to the embodiment illustrated in FIGS. 1 through 3, a sun gear 91 either fixed to or integrated with the sun gear member 204 is designed as a gear having a smaller pitch diameter than the sun gear 41 of the prior art planetary gear mechanism shown in FIGS. 4 through 6 but having the same number of teeth. In other words, the sun gear 91 according to the present embodiment has a smaller module (m=pitch diameter/number of teeth) than the prior art sun gear 41.

A plurality of planet gears 93 (the number of the planet gears is three according to the present embodiment) are arranged around the sun gear 91. Each planet gear 93 is composed of a first planet gear 94 in engagement with a ring gear 44 which is an internally toothed fixed gear and an internally toothed output gear 45 which is an internally toothed turning gear, and a second planet gear 95 in engagement with a sun gear, which are integrated. The second planet gears 95 are arranged in a space between the ring gear 44 and the sun gear member 204 (FIG. 1).

The first planet gear 94 is designed as the same module as the prior art planet gear 43, having the same pitch diameter and the same number of teeth. However, as for the second planet gear 95, since the distance between the center of rotation of the sun gear 91 and the center of rotation of the planet gear 93 is the same as the distance between centers of gears of the prior art planetary gear mechanism, the pitch diameter of the second planet gear 95 is increased and the number of teeth thereof is also increased compared to the prior art gear in correspondence to the reduced pitch diameter of the sun gear 91. The sun gear 91 and the second planet gears 95 are formed of the same module. Accordingly, the reduction gear ratio achieved by the sun gear 91 and the second planet gears 95 becomes greater than the reduction gear ratio achieved by the sun gear 41 and the planet gears 43 of the prior art planetary gear mechanism.

In other words, the present embodiment is designed to draw out the sun gear of the prior art 3K-type mechanical paradox planetary gear mechanism shown in FIGS. 4 through 6 to the direction parallel to the rotational axis thereof, and to form each planet gear 93 of a first planet gear 94 in engagement with a ring gear 44 and an internally toothed output gear 45 and a second planet gear 95 integrated with the first planet gear 94 and in engagement with the sun gear. Therefore, the modules of the first planet gears 94, the ring gear 44 and the internally toothed output gear 45 are the same, and the modules of the sun gear 91 and the second planet gears 95 are also the same, but since the sun gear 91 and the second planet gears 95 are not in engagement with the first planet gears 94, the ring gear 44 and the internally toothed output gear 45, the modules of the sun gear 91 and the second planet gears 95 do not have to be the same as, and can be smaller than, the modules of the first planet gears 94, the ring gear 44 and the internally toothed output gear 45.

As described, the rotation of the sun gear 91 is transmitted to the second planet gears 95 in a reduced speed compared to the prior art planetary gear mechanism and the first planet gears 94 integrally formed with the second planet gears 95 also perform planetary rotation via such reduced speed. Since the first planet gears 94 rotated in a reduced speed are engaged with the ring gear 44 and the internally toothed output gear 45 having slightly different numbers of teeth, the internally toothed output gear 45 achieves a reduced speed having a greater reduction gear ratio corresponding to the reduction of speed of the first level of the planetary gear mechanism.

In the preferred embodiment illustrated in FIGS. 1 through 3, an auxiliary sun gear 96 is disposed below the sun gear 91, which is passed through the center axis of the sun gear 91 and rotatably supported thereto, so that it is rotated with respect to the sun gear 91 and also in engagement with the respective first planet gears 94. The auxiliary sun gear 96 is of the same module as the first planet gears 94. Since the auxiliary sun gear 96 is disposed rotatably with respect to the sun gear 91, it does not interfere with the rotation of the sun gear 91. The auxiliary sun gear 96 does not contribute to the gear reduction of the planetary gear mechanism, but supports the multiple planet gears 93 (the first planet gears 94) from the inner side by being disposed at the center of the multiple first planet gears 94.

Therefore, the auxiliary sun gear 96 is not indispensible and can be omitted from the structure if the first planet gears 94 are not tilted or deflected. Further, the first planet gears 94 and the second planet gears 95 can either be formed separately and fixed to each other or be integrally molded.

As shown in FIG. 1, the present planetary gear mechanism can be applied to a motor-operated valve having a motor composed of a rotor 8 and a stator 2, and a valve member 61 capable of moving toward and away from a valve seat 62 formed on a valve body 10. The rotation of the rotor 8 is transmitted to the sun gear 91, and the internally toothed output gear 45 functioning as an internally toothed turning gear is connected via a screw mechanism to the valve body 61, so that the rotation of the motor is greatly reduced and transmitted to the internally toothed output gear 45, where the rotation is converted into linear motion of the valve body 61, so that an extremely high resolution and high output torque can be achieved with respect to the motor output. Incidentally, the planetary gear mechanism can be arranged within a rotor 8 disposed in a can 30.

In the above example, the number of teeth of the sun gear 91 is set equal to the number of teeth of the prior art sun gear 41. However, the present invention is not restricted to such example, and the number of teeth of the sun gear 91 or the numbers of teeth of the first planet gears 94, the second planet gears 95, the ring gear 44 and the internally toothed output gear 45 can be arbitrarily selected and determined in accordance with the reduction rate, the size or the purpose of the planetary gear mechanism 90.

Therefore, the number of teeth of the sun gear 91 can be increased and/or the number of teeth of the second planet gear 95 can be reduced to achieve a greater speed compared to the reduction gear mechanism illustrated in FIGS. 4 through 6.

Further, planetary gear devices having various reduction ratios can easily be manufactured by designing the first planet gears 94, the ring gear 44 and the internally toothed output gear 45 as common components and only arbitrarily designing (selecting modules and numbers of teeth of) the sun gear 91 and the second planet gears 95 to achieve the desired reduction gear ratios and torques of the respective planetary gear devices.

What is claimed is:

1. A motor-operated valve comprising:
   a motor composed of a rotor and a stator;
   a valve member being moved toward and away from a valve seat formed on the valve body; and
   a planetary gear mechanism comprising:
   a sun gear;
   one or more planet gears in engagement with the sun gear;
   an internally toothed fixed gear in engagement with the planet gears; and an internally toothed turning gear in engagement with the planet gears;

wherein each planet gear is composed of a first planet gear in engagement with the internally toothed fixed gear and the internally toothed turning gear, and a second planet gear which is formed integrally with the first planet gear and having a smaller module than the first planet gear; and the sun gear is in engagement with each second planet gear, wherein the rotation of the rotor is transmitted to the sun gear, and the internally toothed turning gear is connected to the valve member.

2. The motor-operated valve according to claim 1, wherein the sun gear is formed of a same module as the second planet gears.

3. The motor-operated valve according to claim 1, wherein a plurality of the planet gears are provided; and an auxiliary sun gear in engagement with the first planet gears is disposed rotatably at a center of the first planet gears.

4. The motor-operated valve according to claim 2, wherein a plurality of the planet gears are provided; and an auxiliary sun gear in engagement with the first planet gears is disposed rotatably at a center of the first planet gears.

5. The motor-operated valve according to claim 3, wherein the auxiliary sun gear is supported on a center axis of the sun gear.

6. The motor-operated valve according to claim 4, wherein the auxiliary sun gear is supported on a center axis of the sun gear.

7. The motor-operated valve according to claim 1, wherein the planetary gear mechanism is arranged within the rotor.

8. The motor-operated valve according to claim 1, wherein the rotor is arranged within a can disposed on the valve body.

* * * * *